US011536217B2

(12) United States Patent
Bungo et al.

(10) Patent No.: US 11,536,217 B2
(45) Date of Patent: Dec. 27, 2022

(54) INFORMATION PROVIDING SYSTEM

(71) Applicant: HONDA MOTOR CO., LTD., Tokyo (JP)

(72) Inventors: Keiichiro Bungo, Wako (JP); Takashi Hashizume, Wako (JP); Akifumi Fujima, Wako (JP); Hisanori Kanayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 16/497,947

(22) PCT Filed: Mar. 31, 2017

(86) PCT No.: PCT/JP2017/013853
§ 371 (c)(1),
(2) Date: Sep. 26, 2019

(87) PCT Pub. No.: WO2018/179444
PCT Pub. Date: Oct. 4, 2018

(65) Prior Publication Data
US 2020/0408166 A1 Dec. 31, 2020

(51) Int. Cl.
*F02D 43/04* (2006.01)
*G05B 19/418* (2006.01)

(52) U.S. Cl.
CPC ......... *F02D 43/04* (2013.01); *G05B 19/4185* (2013.01)

(58) Field of Classification Search
CPC .... F02D 43/04; G05B 19/4185; G06Q 10/20; G06Q 10/00

(Continued)

(56) References Cited

U.S. PATENT DOCUMENTS

| 5,253,159 A | 10/1993 | Bilas et al. |
| 2008/0203815 A1* | 8/2008 | Ozawa ............... B60R 25/1001 307/10.2 |

(Continued)

FOREIGN PATENT DOCUMENTS

| CN | 102959207 | 3/2013 |
| CN | 105960573 | 9/2016 |

(Continued)

OTHER PUBLICATIONS

European Search Report dated Mar. 23, 2020, 7 pages.
International Search Report, dated Jun. 13, 2017 (Jun. 13, 2017), 2 pages.

*Primary Examiner* — Scott A Reinbold
(74) *Attorney, Agent, or Firm* — Rankin, Hill & Clark LLP

(57) ABSTRACT

An information providing system for an internal combustion engine includes an internal combustion engine, which includes an electronic control type fuel injecting device, an operation permitting device, which can be removably mounted on the internal combustion engine, wherein while the operation permitting device is mounted on the internal combustion engine, which is associated with the operation permitting device in advance, the operation permitting device supplies electric power to the fuel injecting device at a start of the internal combustion engine, and an information providing device, which provides information about use of the internal combustion engine to a destination associated with a user of the operation permitting device, based on an operation history of the associated internal combustion engine. The operation permitting device includes a transmission unit that transmits, to the information providing device, user information of the operation permitting device and the operation history of the associated internal combustion engine.

7 Claims, 4 Drawing Sheets

(58) Field of Classification Search
USPC .......................................................... 701/102
See application file for complete search history.

(56) References Cited

U.S. PATENT DOCUMENTS

| | | | |
|---|---|---|---|
| 2008/0228515 A1 | 9/2008 | Tachikawa | |
| 2014/0172192 A1 | 6/2014 | Kato | |
| 2014/0230762 A1 | 8/2014 | Nakashima | |
| 2015/0204758 A1* | 7/2015 | Schnell | G01M 15/05 |
| | | | 73/114.13 |
| 2015/0281019 A1* | 10/2015 | Hashizume | H04L 41/147 |
| | | | 709/224 |
| 2015/0330869 A1 | 11/2015 | Ziarno | |
| 2016/0025027 A1* | 1/2016 | Mentele | F02D 41/2429 |
| | | | 701/102 |
| 2016/0258836 A1* | 9/2016 | Raman | G01N 29/44 |
| 2017/0010116 A1 | 1/2017 | Inoue et al. | |

FOREIGN PATENT DOCUMENTS

| | | |
|---|---|---|
| EP | 3 064 921 | 9/2016 |
| JP | 2003-080528 | 3/2003 |
| JP | 2004-118471 | 4/2004 |
| JP | 2005-030400 | 2/2005 |
| JP | 2005-196399 | 7/2005 |
| JP | 2007-138713 | 6/2007 |
| JP | 2007-140582 | 6/2007 |
| JP | 2008-225614 | 9/2008 |
| JP | 2011-181079 | 9/2011 |
| JP | 2014-015881 | 1/2014 |
| JP | 2014-038437 | 2/2014 |
| JP | 2015-187822 | 10/2015 |
| JP | 2015-534921 | 12/2015 |
| JP | 2016-076123 | 5/2016 |
| JP | 2016-094030 | 5/2016 |
| WO | 03/021099 | 3/2003 |

* cited by examiner

INFORMATION PROVIDING SYSTEM

TECHNICAL FIELD

The present invention relates to an information providing system about an internal combustion engine which can be started when an operation permitting device is mounted on the internal combustion engine.

BACKGROUND ART

Patent Document 1 discloses a managing system for a marine internal combustion engine, which can easily deal with acquisition of maintenance authentication when the maintenance authentication is required after the marine internal combustion engine is maintained in a maintenance center. In the managing system, a maintenance time is obtained from a calculation result of a degradation degree or a load degree of the marine internal combustion engine, and maintenance reservation information is transmitted before the maintenance time, so that maintenance reservation in the maintenance center can be made automatically.

PRIOR ART DOCUMENT

Patent Document

Patent Document 1: JP-A-2011-181079

SUMMARY OF INVENTION

Problem to be Solved by Invention

The managing system described in Patent Document 1 is provided for managing the maintenance time of the marine internal combustion engine in the maintenance center. Before maintenance is performed in the maintenance center, maintenance of the marine internal combustion engine is left to a user. For this reason, there is a possibility that the maintenance cannot be performed properly when the user has not enough knowledge or low level of attention about the maintenance of the marine internal combustion engine. When the maintenance cannot be performed properly, degradation of the marine internal combustion engine progresses. Therefore, it is desirable that information about the maintenance or the like is provided to the user suitably.

Accordingly, an object of the present invention is to provide an information providing system in which a user of an internal combustion engine can suitably refer to information about use of the internal combustion engine.

Means for Solving the Problem

The present invention provides:

an information providing system about an internal combustion engine (e.g. a general-purpose engine E according to an embodiment), which includes:

an internal combustion engine which includes an electronic control type fuel injecting device (e.g. a fuel pump 36, a regulator 32b, an injector 34 and a spark plug 42 according to the embodiment);

an operation permitting device (e.g. an operation permitting device 100 according to the embodiment) which can be removably mounted on the internal combustion engine, wherein while the operation permitting device is mounted on the internal combustion engine which is associated with the operation permitting device in advance, the operation permitting device supplies electric power to the fuel injecting device at a start of the internal combustion engine; and an information providing device (e.g. a server 205 according to the embodiment) which provides information about use of the internal combustion engine to a destination associated with a user of the operation permitting device, based on an operation history of the associated internal combustion engine, wherein the operation permitting device includes a transmission unit (e.g. a wireless unit 103 according to the embodiment) which transmits, to the information providing device, user information of the operation permitting device and the operation history of the associated internal combustion engine.

DESCRIPTION OF EMBODIMENTS

An information providing system according to an embodiment of the present invention will be described with reference to the drawings. It is supposed that each drawing is viewed in accordance with the direction of reference signs included therein.

Figure 1:
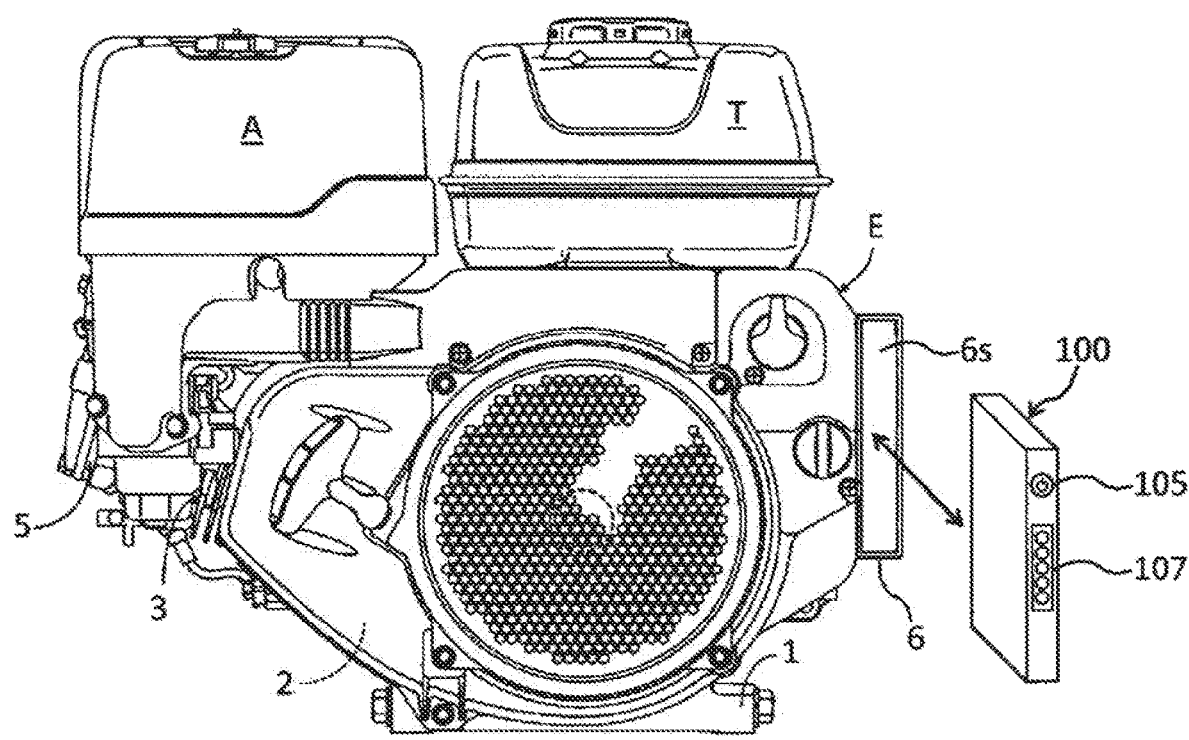
FIG. 1 is a view showing a relation between a general-purpose engine and an operation permitting device which configure an information providing system according to the present invention.

FIG. 1 is a view showing a relation between a general-purpose engine and an operation permitting device which configure the information providing system according to the present invention. As shown in FIG. 1, the operation permitting device 100 can be removably mounted on the general-purpose engine E. The general-purpose engine E cannot be started unless the operation permitting device 100 is mounted on the general-purpose engine E. The general-purpose engine E which can be operated by the operation permitting device 100 is associated with the operation permitting device 100 in advance. Information about use of the general-purpose engine E based on an operation history of the associated general-purpose engine E is provided to a predetermined destination associated with a user of the operation permitting device 100. The general-purpose engine E is used as a power source of an industrial small-sized working machine, for example, for an agriculture field or a construction field.

As shown in FIG. 1, the general-purpose engine E includes a crankcase 2, a cylinder block 3 and a cylinder head 5. The crankcase 2 includes an installation flange 1 at its bottom portion. The cylinder block 3 is inclined and extends from one side of the crankcase 2. The cylinder head 5 is fitted to an end surface of the cylinder block 3 through a gasket. A fuel tank T is attached to an upper portion of the crankcase 2. An air cleaner A is attached to an upper portion of the cylinder block 3. The installation flange 1 is installed in a working machine which uses the general-purpose engine E as its power source.

A receptacle 6 for mounting the operation permitting device 100 on the general-purpose engine E is attached to the other side of the crankcase 2 of the general-purpose engine E. A terminal (not shown) which can be connected to a terminal (not shown) provided in a back surface of the operation permitting device 100 is provided in an inner part of a reception space 6s of the receptacle 6. When the operation permitting device 100 is inserted into the reception space 6s of the receptacle 6 to make the terminals electrically connected to each other, electric signals can be mutually transmitted between an Electric Control Unit (ECU) controlling operation of the general-purpose engine E and a Central Processing Unit (CPU) of the operation permitting device 100, and electric power can be supplied from the operation permitting device 100 to the general-purpose engine E. When a power supply switch 105 provided in a front surface of the operation permitting device 100 is operated on this occasion, the general-purpose engine E starts, and an indicator 107 of the operation permitting device 100 performs lighting.

Figure 2:
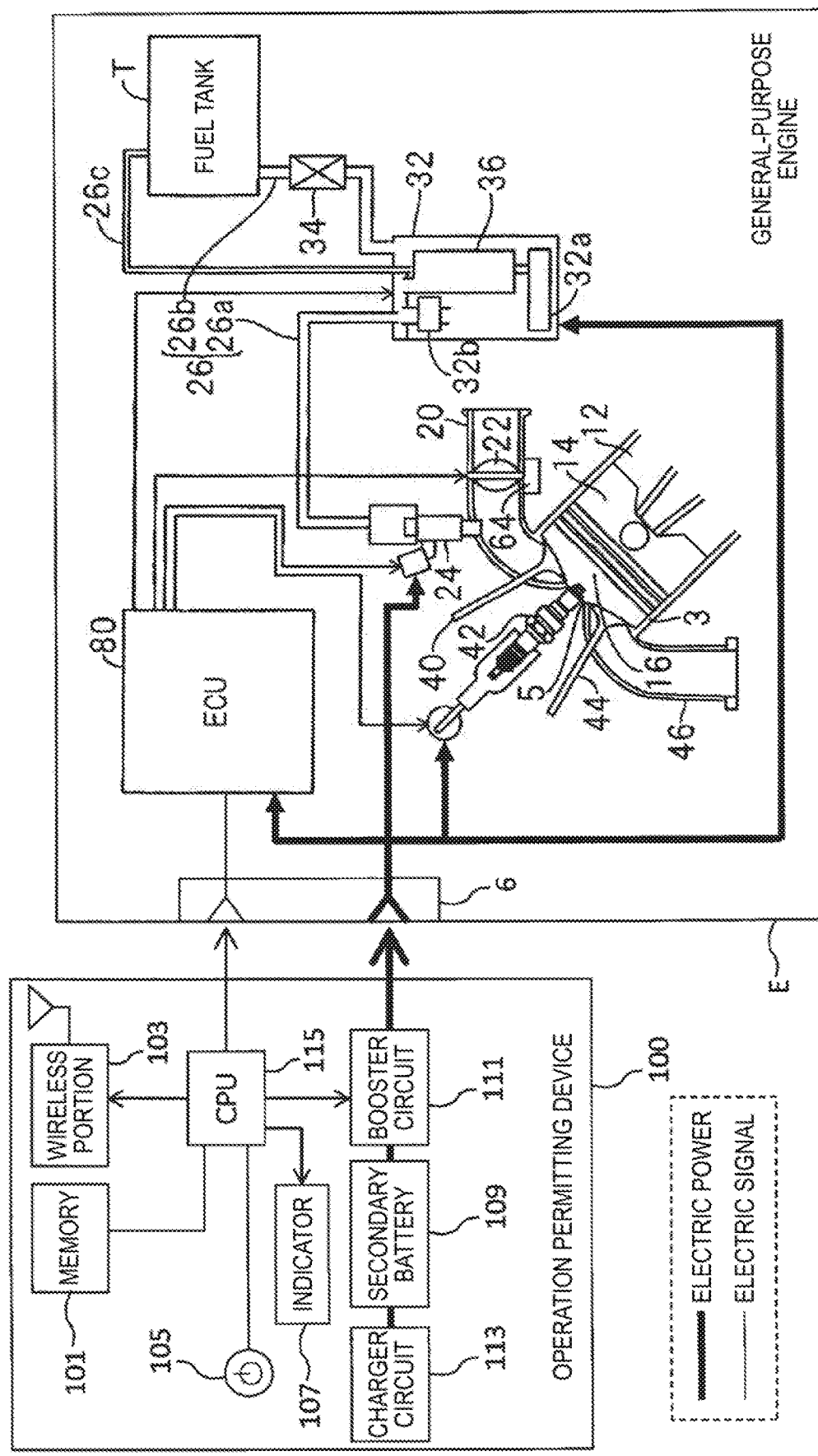
FIG. 2 is a view showing an internal configuration of the general-purpose engine and an internal configuration of the operation permitting device.

An internal configuration of the general-purpose engine E and an internal configuration of the operation permitting device 100, and a relation therebetween will be described below with reference to FIG. 2.

First, the internal configuration of the general-purpose engine E will be described. A piston 14 is received reciprocatably in a cylinder (steam cylinder) 12 formed in the cylinder block 3 of the general-purpose engine 10. The cylinder head 5 is attached to the cylinder block 3, and a combustion chamber 16 is formed between the cylinder head 5 and a top portion of the piston 14. A suction pipe 20 is connected to the combustion chamber 16. A throttle valve 22 is disposed in the suction pipe 20, and an injector 24 is disposed in the vicinity of a suction port on a downstream side of the throttle valve 22. The injector 24 is connected to the fuel tank T through a fuel supply pipe 26.

Specifically, the injector 24 is connected to a sub fuel tank 32 through a first fuel supply pipe 26a, and the sub fuel tank 32 is connected to the fuel tank T through a second fuel supply pipe 26b. A low pressure pump 34 is inserted in the second fuel supply pipe 26b to pump up fuel (gasoline) reserved in the fuel tank T to pneumatically supply the fuel to the sub fuel tank 32. A fuel pump (high pressure pump) 36 is disposed in the sub fuel tank 32.

The fuel pump 36 pressurizes the fuel filtered by a filter 32a to high pressure to supply the fuel to the injector 24 through the first fuel supply pipe 26a while a regulator 32b regulates the pressure of the fuel. The fuel of the sub fuel tank 32 is partially returned to the fuel tank T through a return pipe 26c.

Intake air suctioned from the air cleaner A flows through the suction pipe 20. After a flow rate of the intake air is adjusted by the throttle valve 22, the intake air reaches the suction port where the intake air is mixed with fuel injected from the injector 24 to thereby form a fuel-air mixture. When a suction valve 40 is opened, the fuel-air mixture flows into the combustion chamber 16 to be ignited by a spark plug 42 and combusted so as to drive the piston 14. When an exhaust valve 44 is opened, exhaust gas generated due to the combustion flows through an exhaust pipe 46 so as to be released to the outside.

An electric motor (an actuator, specifically, a stepping motor) 64 is coupled to the throttle valve 22. The electric motor 64 is configured to open and close the throttle valve 22 independently of operation of an accelerator lever (not shown). That is, the throttle valve 22 is formed as a drive-by-wire type.

Respective operations of the fuel pump 36, the regulator 32b, the injector 24, the spark plug 42, and the electric motor 64 which have been described above are controlled by the Electric Control Unit (ECU) 80 of the general-purpose engine 10. The ECU 80 can perform communication of electric signals with an external device (the operation permitting device 100) through the terminal of the receptacle 6. Incidentally, supply of electric power to the ECU 80, the fuel pump 36, the regulator 32b, the injector 24 and the spark plug 42 can be performed also from the operation permitting device 100 through the terminal of the receptacle 6. Therefore, at a start of the general-purpose engine E, electric power is supplied from the operation permitting device 100 to the power-source-requiring components when the operation permitting device 100 is mounted on the receptacle 6. Incidentally, electric power obtained by a power generating coil (not shown) provided in the general-purpose engine E is supplied to the power-source-requiring components after the start of the general-purpose engine E.

Next, the internal configuration of the operation permitting device 100 will be described. The operation permitting device 100 includes a memory 101, a wireless unit 103, a power switch 105, an indicator 107, a secondary battery 109, a booster circuit 111, a charger circuit 113, and a Central Processing Unit (CPU) 115.

The memory 101 stores user information of the operation permitting device 100, and information about the general-purpose engine E associated with the operation permitting device 100 in advance. The user information of the operation permitting device 100 includes a destination associated with the user of the operation permitting device 100. The information about the general-purpose engine E includes individual information of the general-purpose engine E. Further, an operation history of the general-purpose engine E is recorded in the memory 101 by the CPU 115. The operation history includes not only a history of an operating time of the general-purpose engine E but also histories of a torque representing the magnitude of a load on the general-purpose engine E in operation, a rotation speed, temperature, or the like.

The wireless unit 103 performs wireless communication, for example, with a portable information terminal owned by the user of the operation permitting device 100. The power switch 105 is operated to start the general-purpose engine E or stop operation of the general-purpose engine E. When the power switch 105 is operated in a state where the operation permitting device 100 is mounted on the general-purpose engine E, the general-purpose engine E starts or stops. The indicator 107 performs lighting or blinking in accordance with the state of the general-purpose engine E.

The secondary battery 109 is a chargeable and dischargeable lithium-ion battery which, for example, outputs a voltage of about 3.7 V. The booster circuit 111 boosts an output voltage of the secondary battery 109, for example, to 12 V. The voltage boosted by the booster circuit 111 is supplied to the components, which require a power source at the start of the general-purpose engine E, through the terminal of the receptacle 6 of the general-purpose engine E when the operation permitting device 100 is mounted on the general-purpose engine E. When the operation permitting device 100 removed from the general-purpose engine E is connected to an external power source through a cable or the like, the charger circuit 113 charges the secondary battery 109 which is low in charging state.

The CPU 115 controls operations of the operation permitting device 100 including the boosting operation of the booster circuit 111, the charging operation of the charger circuit 113, or the like. When the operation permitting device 100 is mounted on the general-purpose engine E, the CPU 115 can perform communication of electric signals with the ECU 80 of the general-purpose engine E through the terminal of the receptacle 6 of the general-purpose engine E. Once the operation permitting device 100 is mounted on the general-purpose engine E, the CPU 115 starts the boosting operation of the booster circuit 111 when the individual information obtained from the ECU 80 of the general-purpose engine E in response to a request matches with the information about the general-purpose engine E recorded in the memory 101. The booster circuit 111 does not have to perform the boosting operation when the general-purpose engine E can be operated by the output voltage of the secondary battery 109.

Next, provision of the information about the use of the general-purpose engine E based on the operation history of the general-purpose engine E will be described with reference to FIG. 3.

Figure 3:
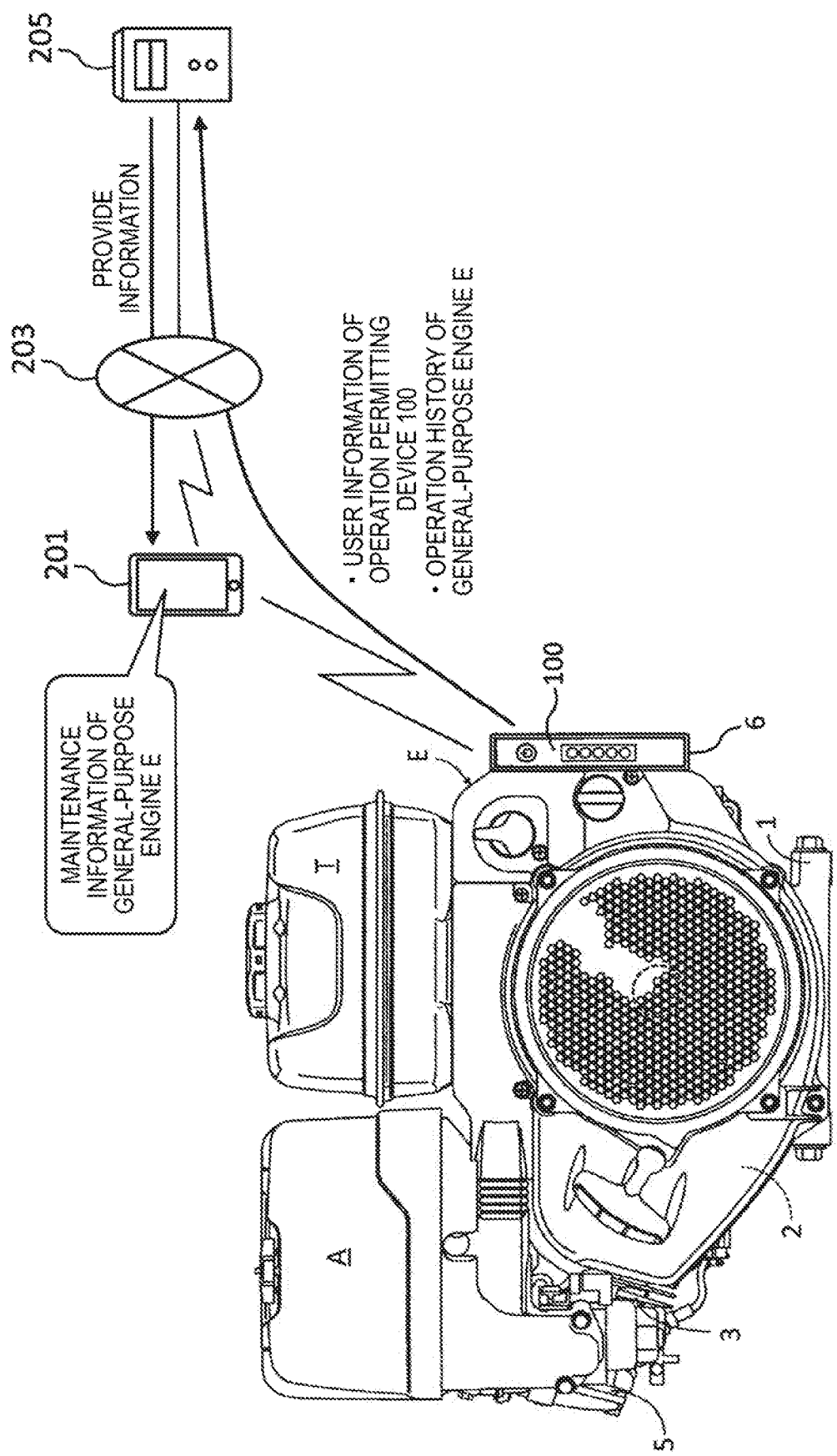
FIG. 3 is a view showing an overall configuration and an information flow of the information providing system according to the present invention.

In an example of FIG. 3, the user information of the operation permitting device 100 and the operation history of the general-purpose engine E are transmitted to a server 205 through a portable information terminal 201 and a network 203 when the operation permitting device 100 is mounted on the general-purpose engine E. The portable information terminal 201 is owned by the user of the operation permitting device 100. The server 205 provides the information about the use of the general-purpose engine E to the predetermined destination included in the user information of the operation permitting device 100 based on the operation history of the general-purpose engine E. The predetermined destination is, for example, an address of an electronic mail which the user can browse by the portable information terminal 201 or identification information unique to a terminal on a web network.

The contents of the information provided by the server 205 are different depending on a rank which is set for each user of the operation permitting device 100. That is, the server 205 selects information of contents which are different depending on the rank included in the user information of the operation permitting device 100, and transmits the selected information to the predetermined destination. For example, it is assumed that the information to be provided by the server 205 is maintenance information of the general-purpose engine E. In this case, the server 205 provides detailed maintenance information to the user when the user is set at a high rank who has high level of knowledge or attention about the maintenance or the like of the general-purpose engine E. On the other hand, the server 205 provides minimum maintenance information, which is easy to understand, to the user when the user is set at a low rank who has low level of the aforementioned knowledge or attention.

Incidentally, the example shown in FIG. 3 shows a state where the operation permitting device 100 is mounted on the general-purpose engine E. Even when the operation permitting device 100 is not mounted on the general-purpose engine E, the operation permitting device 100 still can make communication with the portable information terminal 201. The predetermined destination to which the information about the use of the general-purpose engine E is provided may be stored in advance by the server 205 in association with the user information of the operation permitting device 100.

According to the embodiment as described above, the operation permitting device 100 transmits the user information of the operation permitting device 100 and the operation history of the associated general-purpose engine E to the server 205. The server 205 provides the information of maintenance or the like about the use of the general-purpose engine E to the predetermined destination based on the transmitted operation history. Therefore, when the user of the operation permitting device 100 browses the information provided to the predetermined destination, the user can refer to the information of the maintenance or the like about the use of the general-purpose engine E suitably.

Further, the contents of the information about the use of the general-purpose engine E are different depending on the rank of the user of the operation permitting device 100. For example, detailed maintenance information is provided to the user when the user has high level of knowledge or attention about the maintenance or the like of the general-purpose engine E, while minimum maintenance information easy to understand is provided to the user when the user has low level of the knowledge or attention. Accordingly, information with suitable contents can be provided to the user.

Incidentally, the present invention is not limited to the above-described embodiment. Any modification, improvement or the like can be made on the present invention suitably. For example, the number of general-purpose engines E which can be operated using the operation permitting device 100 is not limited to one but may be plural. In this case, pieces of individual information of general-purpose engines E which can be operated are registered as pieces of information about the general-purpose engines E in the memory 101 of the operation permitting device 100. Among the general-purpose engines E which can be operated, only a general-purpose engine E on which the operation permitting device 100 is mounted is allowed to be started. The general-purpose engines E which can be operated are not limited according to the individual engines but may be limited according to types such as models of engines.

When a plurality of general-purpose engines E which can be operated are registered for one operation permitting device 100, respective operation histories of the general-purpose engines E which can be operated are recorded in the memory 101 of the operation permitting device 100. The CPU 115 of the operation permitting device 100 may limit start of a general-purpose engine E which is highest in operation rate, based on the respective operation histories of the general-purpose engines E recorded in the memory 101. Accordingly, the start of the general-purpose engine E which is highest in operation rate is limited when there is a deviation in the operation rate among the general-purpose engines E based on the respective operation histories of the general-purpose engines E. Thus, the operation rates of the general-purpose engines E can be made approximately equal to one another.

Figure 4:
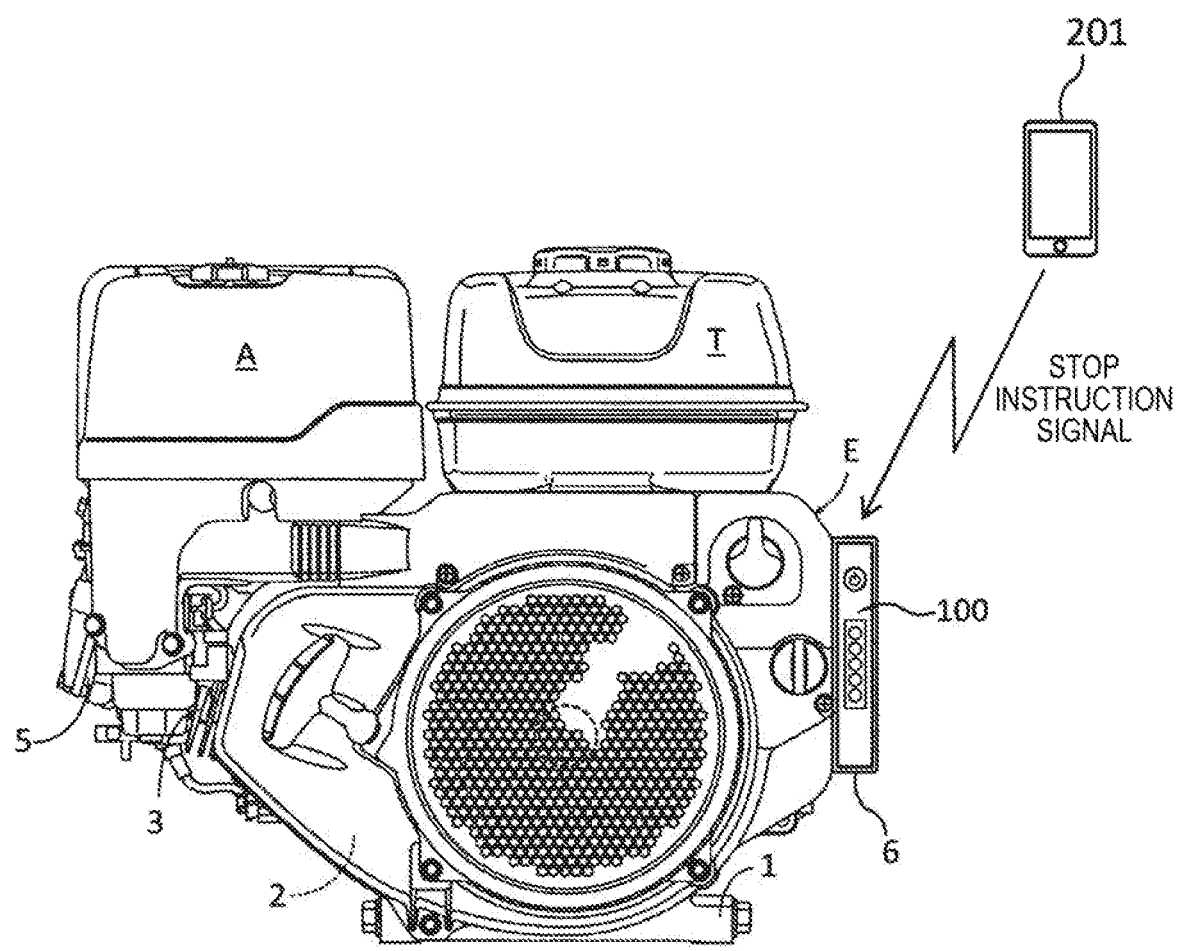
FIG. 4 is a view using a portable information terminal to issue a signal to stop operation of the general-purpose engine.

The portable information terminal 201 shown in FIG. 3 serves as a proxy for the wireless unit 103 of the operation permitting device 100 which is connected to the network 203. The user can browse the information provided to the predetermined destination from the server 205. The user of the operation permitting device 100 may use the portable information terminal 201 to perform operation to stop operation of the general-purpose engine E. As shown in FIG. 4, the portable information terminal 201 on which the operation is performed transmits a stop instruction signal to the operation permitting device 100, and the wireless unit 103 of the operation permitting device 100 receives the signal. The stop instruction signal received by the wireless unit 103 is sent to the CPU 115. The CPU 115 transmits the signal to the ECU 80 of the general-purpose engine E. The ECU 80 stops control for operation of the general-purpose engine E in accordance with the stop instruction signal transmitted from the operation permitting device 100. As a result, the general-purpose engine E stops operating.

The present invention provides the following aspects.

A first aspect provides an information providing system about an internal combustion engine (e.g. a general-purpose engine E according to an embodiment), which includes:

an internal combustion engine which includes an electronic control type fuel injecting device (e.g. a fuel pump 36, a regulator 32b, an injector 34 and a spark plug 42 according to the embodiment);

an operation permitting device (e.g. an operation permitting device 100 according to the embodiment) which can be removably mounted on the internal combustion engine, wherein while the operation permitting device is mounted on the internal combustion engine which is associated with the operation permitting device in advance, the operation permitting device supplies electric power to the fuel injecting device at a start of the internal combustion engine; and an information providing device (e.g. a server 205 according to the embodiment) which provides information about use of the internal combustion engine to a destination associated with a user of the operation permitting device, based on an operation history of the associated internal combustion engine, wherein the operation permitting device includes a transmission unit (e.g. a wireless unit 103 according to the embodiment) which transmits, to the information providing device, user information of the operation permitting device and the operation history of the associated internal combustion engine.

A second aspect provides the information providing system according to the first aspect, wherein contents of the information about the use of the internal combustion engine provided by the information providing device are different depending on a rank which is set for each user.

A third aspect provides the information providing system according to the first or second aspect, wherein the operation permitting device is registered to be allowed to operate a plurality of internal combustion engine, and among the plurality of internal combustion engines, only an internal combustion engine on which the operation permitting device is mounted is permitted to be started.

A fourth aspect provide the information providing system according to the third aspect, wherein the operation permitting device limits start of an internal combustion engine which is highest in operation rate based on respective operation histories of the plurality of internal combustion engines.

A fifth aspect provides the information providing system according to any of the first to fourth aspects, wherein the operation permitting device includes an instruction receiving unit (e.g. the wireless unit 103 according to the embodiment) which receives, from the outside, a stop instruction to stop operation of the internal combustion engine, and the internal combustion engine on which the operation permitting device is mounted stops operation when the stop instruction is received by the instruction receiving unit.

According to the first aspect, the transmission unit of the operation permitting device transmits the user information of the operation permitting device and the operation history of the associated internal combustion engine to the information providing device. The information providing device provides the information of maintenance or the like about the use of the internal combustion engine to the predetermined destination based on the transmitted operation history. Therefore, when the user of the operation permitting device browses the information provided to the predetermined destination, the user can suitably refer to the information of the maintenance or the like about the internal combustion engine associated with the operation permitting device in advance.

According to the second aspect, the contents of the information about the use of the internal combustion engine are different depending on the rank which is set for each user. For example, detailed maintenance information is provided to the user when the user has high level of knowledge or attention about the maintenance or the like of the internal combustion engine. On the other hand, minimum maintenance information easy to understand is provided to the user when the user has low level of the knowledge or attention. Accordingly, information with suitable contents can be provided to the user.

According to the third aspect, any one of the internal combustion engines can be started with the operation permitting device.

According to the fourth aspect, when there is a deviation in operation rate among the internal combustion engines based on the operation histories of the internal combustion engines, start of the internal combustion engine highest in operation rate is limited such that the operation rates of the internal combustion engines can be made approximately equal to one another.

According to the fifth aspect, the operation of the internal combustion engine can be stopped by remote control.

The invention claimed is:

1. An information providing system for providing information about an internal combustion engine, the system comprising:
   the internal combustion engine which includes an electronic control type fuel injecting device;
   an operation permitting device which can be removably mounted on the internal combustion engine and which includes a processor, the processor being configured to permit the internal combustion engine to start, when the operation permitting device is mounted on the internal combustion engine, by being configured to supply electric power to the fuel injecting device at a start of the internal combustion engine; and
   an information providing device including a server which is configured to provide information about use of the internal combustion engine to a destination associated with a user of the operation permitting device, based on an operation history of the internal combustion engine,
   wherein the operation permitting device includes a wireless unit which is configured to transmit, to the information providing device, user information of the operation permitting device and the operation history of the internal combustion engine,
   wherein the operation permitting device is registered to be allowed to operate a plurality of internal combustion engines,
   wherein among the plurality of internal combustion engines, only an internal combustion engine on which the operation permitting device is mounted is permitted to be started, and
   wherein when there is a deviation in operation rates among the plurality of internal combustion engines based on operation histories of the plurality of internal combustion engines, the operation permitting device is configured to limit start of an internal combustion engine which is highest in operation rate based on respective operation histories of the plurality of internal combustion engines such that the operation rates of the plurality of internal combustion engines can be made to approach equalization with one another.

2. The information providing system according to claim 1, wherein contents of the information about the use of the internal combustion engine provided by the information providing device are different depending on a rank which is set for each user.

3. The information providing system according to claim 1, wherein the wireless unit is configured to receive, from outside, a stop instruction to stop operation of the internal combustion engine, and
wherein the internal combustion engine on which the operation permitting device is mounted is configured to stop operation when the stop instruction is received by the wireless unit.

4. The information providing system according to claim 2, wherein wireless unit is configured to receive, from outside, a stop instruction to stop operation of the internal combustion engine, and
wherein the internal combustion engine on which the operation permitting device is mounted is configured to stop operation when the stop instruction is received by the wireless unit.

5. The information providing system according to claim 1, wherein the operation permitting device includes a memory for storing user information and information about a general-purpose engine, which are associated with the operation permitting device in advance,
wherein the memory stores information of each of the plurality of internal combustion engines which can be operated.

6. The information providing system according to claim 1, wherein the operation permitting device includes a power switch to start and stop the internal combustion engine.

7. The information providing system according to claim 1, wherein the operation permitting device includes a battery, which is configured to supply starting power to the fuel injecting device.

* * * * *